US011931874B2

(12) United States Patent
Mikat-Stevens

(10) Patent No.: US 11,931,874 B2
(45) Date of Patent: Mar. 19, 2024

(54) POWERED FASTENER DRIVER

(71) Applicant: MILWAUKEE ELECTRIC TOOL CORPORATION, Brookfield, WI (US)

(72) Inventor: Leo Mikat-Stevens, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/719,878

(22) Filed: Apr. 13, 2022

(65) Prior Publication Data

US 2022/0241946 A1 Aug. 4, 2022

Related U.S. Application Data

(60) Continuation of application No. 17/412,486, filed on Aug. 26, 2021, now Pat. No. 11,801,591, which is a (Continued)

(51) Int. Cl.
*B25C 1/04* (2006.01)
*B25C 5/16* (2006.01)

(Continued)

(52) U.S. Cl.
CPC ............ *B25C 1/041* (2013.01); *B25C 5/1637* (2013.01); *B25C 1/06* (2013.01); *B25C 5/15* (2013.01)

(58) Field of Classification Search
CPC .. B25C 1/00; B25C 1/006; B25C 1/04; B25C 1/041; B25C 1/047; B25C 1/06; B25C 1/08; B25C 5/1637

(Continued)

(56) References Cited

U.S. PATENT DOCUMENTS 2,769,173 A 11/1956 Lindstrom
2,936,456 A 5/1960 Ruskin (Continued)

FOREIGN PATENT DOCUMENTS

CN 103770079 A 5/2014
CN 106142002 A 11/2016

(Continued)

OTHER PUBLICATIONS

European Patent Office Extended Search Report for Application No. 20154512.6 dated Nov. 10, 2020 (9 pages).

(Continued)

*Primary Examiner* — Jacob A Smith
(74) *Attorney, Agent, or Firm* — Michael Best & Friedrich LLP

(57) ABSTRACT

A fastener driver includes a housing, a cylinder disposed within the housing, a piston positioned and moveable within the cylinder, and a driver blade. The driver blade includes a body defining a first end having an aperture defined therein and a second end opposite the first end. The aperture is sized to receive a fastener to attach the driver blade to the piston. The driver blade is moveable with the piston from a first position toward a second position along a longitudinal axis during a fastener driving operation. A nosepiece at least partially defining a fastener driving track through which fasteners are driven. A total length of the fastener driver as measured between a distal end of the nosepiece and a distal end of the cylinder is less than 11.4 inches (289.6 mm).

9 Claims, 16 Drawing Sheets

Related U.S. Application Data division of application No. 16/776,173, filed on Jan. 29, 2020, now Pat. No. 11,130,221.

(60) Provisional application No. 62/799,141, filed on Jan. 31, 2019.

(51) Int. Cl.
*B25C 1/06* (2006.01)
*B25C 5/15* (2006.01)

(58) Field of Classification Search
USPC .......................................... 227/127, 130, 156
See application file for complete search history.

(56) References Cited

U.S. PATENT DOCUMENTS

| | | | | |
|---|---|---|---|---|
| 3,087,162 | A * | 4/1963 | Saurenman | B25C 1/041 91/461 |
| 3,387,541 | A | 6/1968 | Bade | |
| 3,491,931 | A | 1/1970 | Sales | |
| 3,693,863 | A | 9/1972 | Black | |
| 3,734,379 | A | 5/1973 | Powers | |
| 3,856,139 | A | 12/1974 | Black | |
| 3,913,817 | A | 10/1975 | Barrett et al. | |
| 4,305,541 | A | 12/1981 | Barrett et al. | |
| 4,747,338 | A | 5/1988 | Crutcher | |
| 4,749,115 | A | 6/1988 | Fehrs | |
| 5,180,091 | A | 1/1993 | Ota | |
| 5,181,450 | A | 1/1993 | Monacelli | |
| 5,207,143 | A | 5/1993 | Monacelli | |
| 5,337,945 | A | 8/1994 | Fehrle et al. | |
| 5,407,118 | A | 4/1995 | Marks | |
| 5,427,299 | A | 6/1995 | Marks | |
| 5,505,362 | A | 4/1996 | Marks | |
| 5,511,716 | A | 4/1996 | Marks | |
| 5,522,533 | A | 6/1996 | Mukoyama et al. | |
| 5,593,079 | A | 1/1997 | Mukoyama et al. | |
| 5,662,257 | A | 9/1997 | Mukoyama et al. | |
| 5,671,880 | A | 9/1997 | Ronconi | |
| 6,145,727 | A | 11/2000 | Mukoyama et al. | |
| 6,609,646 | B2 | 8/2003 | Miller et al. | |
| 6,648,202 | B2 | 11/2003 | Miller et al. | |
| 6,679,413 | B2 | 1/2004 | Miller et al. | |
| 6,772,931 | B2 | 8/2004 | Miller et al. | |
| 6,837,414 | B1 | 1/2005 | Chou | |
| 6,851,594 | B1 | 2/2005 | Huang | |
| 6,938,809 | B1 | 9/2005 | Schnell | |
| 6,938,812 | B2 | 9/2005 | Miller et al. | |
| RE38,834 | E | 10/2005 | Perra | |
| 6,966,476 | B2 | 11/2005 | Jalbert et al. | |
| 6,986,448 | B2 | 1/2006 | Lat et al. | |
| 7,025,242 | B1 | 4/2006 | Schnell | |
| 7,025,641 | B2 | 4/2006 | Nayrac et al. | |
| 7,025,875 | B2 | 4/2006 | Ehrmaier et al. | |
| 7,134,586 | B2 | 11/2006 | McGee et al. | |
| 7,137,541 | B2 | 11/2006 | Baskar et al. | |
| 7,143,508 | B2 | 12/2006 | Schnell et al. | |
| 7,185,712 | B2 | 3/2007 | Miller et al. | |
| 7,243,831 | B2 | 7/2007 | Ishizawa et al. | |
| 7,284,511 | B2 | 10/2007 | Zahner et al. | |
| 7,285,877 | B2 | 10/2007 | Gorti et al. | |
| 7,497,364 | B2 | 3/2009 | Lee | |
| 7,513,403 | B2 | 4/2009 | Fujimoto | |
| 7,527,106 | B2 | 5/2009 | Miller et al. | |
| 7,565,991 | B2 | 7/2009 | Erhardt | |
| 7,628,304 | B2 | 12/2009 | Yamamoto et al. | |
| 7,646,157 | B2 | 1/2010 | Cruise et al. | |
| 7,694,863 | B2 | 4/2010 | Spasov et al. | |
| 7,753,243 | B2 | 7/2010 | Brendel et al. | |
| 7,757,921 | B2 | 7/2010 | Ishizawa et al. | |
| 7,766,204 | B2 | 8/2010 | Spasov et al. | |
| 7,845,532 | B2 | 12/2010 | Burke et al. | |
| 7,861,905 | B2 | 1/2011 | Miescher et al. | |
| 7,905,377 | B2 | 3/2011 | Krondorfer et al. | |
| 7,938,303 | B2 | 5/2011 | Tamura et al. | |
| 7,971,768 | B2 | 7/2011 | Wywialowski et al. | |
| 7,980,439 | B2 | 7/2011 | Akiba et al. | |
| 7,988,025 | B2 | 8/2011 | Terrell | |
| 8,002,160 | B2 | 8/2011 | Larkin et al. | |
| 8,006,880 | B2 | 8/2011 | Tanaka et al. | |
| 8,006,883 | B2 | 8/2011 | Schnell et al. | |
| 8,011,441 | B2 | 9/2011 | Leimbach et al. | |
| 8,011,547 | B2 | 9/2011 | Leimbach et al. | |
| 8,042,717 | B2 | 10/2011 | Lam et al. | |
| 8,052,021 | B2 | 11/2011 | Wu | |
| 8,083,116 | B2 | 12/2011 | Liang | |
| 8,123,096 | B2 | 2/2012 | Ijima et al. | |
| 8,215,528 | B2 | 7/2012 | Matsunaga et al. | |
| 8,220,687 | B2 | 7/2012 | Yamamoto et al. | |
| 8,230,941 | B2 | 7/2012 | Leimbach et al. | |
| 8,267,296 | B2 | 9/2012 | Leimbach et al. | |
| 8,267,297 | B2 | 9/2012 | Leimbach et al. | |
| 8,286,722 | B2 | 10/2012 | Leimbach et al. | |
| 8,292,143 | B2 | 10/2012 | Lee et al. | |
| 8,347,978 | B2 | 1/2013 | Forster et al. | |
| 8,387,718 | B2 | 3/2013 | Leimbach et al. | |
| 8,397,970 | B2 | 3/2013 | Ijima et al. | |
| 8,408,327 | B2 | 4/2013 | Forster et al. | |
| 8,434,566 | B2 | 5/2013 | Forster et al. | |
| 8,499,991 | B2 | 8/2013 | Spasov et al. | |
| 8,567,654 | B2 | 10/2013 | Wu et al. | |
| 8,602,282 | B2 | 12/2013 | Leimbach et al. | |
| 8,733,610 | B2 | 5/2014 | Pedicini | |
| 8,763,874 | B2 | 7/2014 | McCardle et al. | |
| 8,833,626 | B2 | 9/2014 | Perron et al. | |
| 8,939,341 | B2 | 1/2015 | Pedicini et al. | |
| 9,061,407 | B2 | 6/2015 | Chien et al. | |
| 9,121,427 | B2 | 9/2015 | Young | |
| 9,221,161 | B2 | 12/2015 | Miller et al. | |
| 9,238,298 | B2 | 1/2016 | Wu et al. | |
| 9,346,157 | B2 | 5/2016 | Morioka et al. | |
| 9,463,560 | B2 | 10/2016 | Largo | |
| 9,469,021 | B2 | 10/2016 | Gregory et al. | |
| 9,486,904 | B2 | 11/2016 | Gregory et al. | |
| 9,498,871 | B2 | 11/2016 | Gregory et al. | |
| 9,527,196 | B2 | 12/2016 | Segura | |
| 9,533,408 | B2 | 1/2017 | Forster et al. | |
| 9,555,530 | B2 | 1/2017 | Pedicini et al. | |
| 9,643,305 | B2 | 5/2017 | Gregory et al. | |
| 9,649,755 | B2 | 5/2017 | Gregory et al. | |
| 9,676,088 | B2 | 6/2017 | Leimbach et al. | |
| 9,770,818 | B2 | 9/2017 | Largo | |
| 9,796,072 | B2 | 10/2017 | Young | |
| 9,827,658 | B2 | 11/2017 | Gregory et al. | |
| 10,022,848 | B2 * | 7/2018 | Gross | B25F 5/00 |
| 10,058,985 | B2 | 8/2018 | Raggl et al. | |
| 10,076,830 | B2 | 9/2018 | Raggl et al. | |
| 10,118,283 | B2 | 11/2018 | Wolf et al. | |
| 10,144,120 | B2 | 12/2018 | Segura | |
| 10,272,553 | B2 | 4/2019 | Yang et al. | |
| 10,632,601 | B2 | 4/2020 | Pomeroy et al. | |
| 10,710,227 | B2 | 7/2020 | Pomeroy et al. | |
| 2003/0121948 | A1 | 7/2003 | Hsien | |
| 2003/0146262 | A1 | 8/2003 | Hwang et al. | |
| 2005/0001007 | A1 | 1/2005 | Butzen et al. | |
| 2005/0051590 | A1 | 3/2005 | Buechel | |
| 2005/0194419 | A1 * | 9/2005 | Smolinski | B25C 1/047 227/156 |
| 2006/0102683 | A1 | 5/2006 | Schnell et al. | |
| 2006/0118594 | A1 | 6/2006 | Chen | |
| 2007/0075112 | A1 | 4/2007 | Porth et al. | |
| 2009/0039135 | A1 | 2/2009 | Kubo | |
| 2009/0050667 | A1 | 2/2009 | Po | |
| 2011/0303428 | A1 | 12/2011 | Roth et al. | |
| 2011/0303717 | A1 | 12/2011 | Miescher et al. | |
| 2013/0320063 | A1 | 12/2013 | Gregory et al. | |
| 2013/0320064 | A1 * | 12/2013 | Gregory | B25C 5/162 227/119 |
| 2014/0021237 | A1 | 1/2014 | Chang | |
| 2015/0096776 | A1 | 4/2015 | Garber | |
| 2015/0298308 | A1 | 10/2015 | Kato | |
| 2015/0314432 | A1 | 11/2015 | Yang et al. | |
| 2015/0375381 | A1 | 12/2015 | Tanj | |

(56) References Cited

U.S. PATENT DOCUMENTS

| | | | |
|---|---|---|---|
| 2016/0023342 | A1 | 1/2016 | Koenig et al. |
| 2016/0144497 | A1 | 5/2016 | Boehm et al. |
| 2016/0158927 | A1 | 6/2016 | Largo |
| 2016/0207185 | A1 | 7/2016 | Garber et al. |
| 2016/0325420 | A1 | 11/2016 | Krout et al. |
| 2017/0066116 | A1 | 3/2017 | Garber et al. |
| 2017/0259417 | A1 | 9/2017 | Kondou |
| 2017/0266796 | A1 | 9/2017 | Eimbach et al. |
| 2017/0274511 | A1 | 9/2017 | Huang |
| 2018/0001453 | A1 | 1/2018 | Jaskot et al. |
| 2018/0001457 | A1 | 1/2018 | Jaskot et al. |
| 2018/0009096 | A1 | 1/2018 | Grazioli et al. |
| 2018/0015600 | A1 | 1/2018 | Akiba |
| 2018/0029211 | A1 | 2/2018 | Young |
| 2018/0036870 | A1 | 2/2018 | Komazaki et al. |
| 2018/0071904 | A1 | 3/2018 | Gregory et al. |
| 2018/0085904 | A1 | 3/2018 | Gregory et al. |
| 2018/0093370 | A1 | 4/2018 | Yip et al. |
| 2018/0099400 | A1 | 4/2018 | Wong et al. |
| 2018/0117748 | A1 | 5/2018 | Ishikawa et al. |
| 2018/0126527 | A1* | 5/2018 | Pomeroy .................. B25C 1/04 |
| 2018/0133877 | A1 | 5/2018 | Ueda |
| 2018/0154505 | A1 | 6/2018 | Sato et al. |
| 2018/0178361 | A1 | 6/2018 | Kabbes et al. |
| 2018/0178362 | A1 | 6/2018 | Kamimoto et al. |
| 2018/0207779 | A1 | 7/2018 | Marks |
| 2018/0290279 | A1 | 10/2018 | Kobori et al. |
| 2018/0290280 | A1 | 10/2018 | Gross et al. |
| 2019/0344415 | A1 | 11/2019 | Furumi et al. |
| 2020/0215672 | A1 | 7/2020 | Pomeroy et al. |
| 2020/0230791 | A1 | 7/2020 | Pomeroy et al. |
| 2020/0246949 | A1 | 8/2020 | Mikat-Stevens |

FOREIGN PATENT DOCUMENTS

| | | | |
|---|---|---|---|
| DE | 1703921 | B1 | 8/1971 |
| DE | 29600029 | U1 | 12/1996 |
| DE | 20217134 | U1 | 1/2003 |
| EP | 0584395 | A1 | 3/1994 |
| EP | 0584394 | B1 | 11/1998 |
| EP | 2301718 | A2 | 3/2011 |
| EP | 3243605 | A1 | 11/2017 |
| GB | 2425087 | A | 10/2006 |
| JP | H09300238 | A | 11/1997 |
| WO | 2019030031 | A1 | 2/2019 |

OTHER PUBLICATIONS

NASA, “Anthropometry and Biomechanics”, <https://msis.jsc.nasa.gov/sections/section03.htm>, retrieved Dec. 31, 2020.

* cited by examiner

POWERED FASTENER DRIVER

CROSS-REFERENCE TO RELATED APPLICATIONS

This application is a continuation of U.S. patent application Ser. No. 17/412,486 filed on Aug. 26, 2021, now U.S. Pat. No. 11,805,591, which is a divisional of U.S. patent application Ser. No. 16/776,173 filed on Jan. 29, 2020, now U.S. Pat. No. 11,130,221, which claims priority to U.S. Provisional Patent Application No. 62/799,141 filed on Jan. 31, 2019, the entire contents of which are incorporated herein by reference.

FIELD OF THE INVENTION

The present invention relates to powered fastener drivers, and more particularly to a driver blade and nosepiece for use with a powered fastener driver.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.) to drive a driver blade from a top-dead-center position to a bottom-dead-center position.

SUMMARY OF THE INVENTION

The invention provides, in one aspect, a fastener driver including a housing, a cylinder disposed within the housing, a piston positioned and moveable within the cylinder, and a driver blade including a body defining a first end having an aperture defined therein and a second end opposite the first end. The aperture is sized to receive a fastener to attach the driver blade to the piston. The driver blade is moveable with the piston from a first position toward a second position along a longitudinal axis during a fastener driving operation. A nosepiece at least partially defines a fastener driving track through which fasteners are driven. A total length of the fastener driver as measured between a distal end of the nosepiece and a distal end of the cylinder is less than 11.4 inches (289.6 mm).

The invention provides, in another aspect, a fastener driver including a housing, a cylinder disposed within the housing, a piston positioned and moveable within the cylinder, and a driver blade including a body defining a first end, a second end opposite the first end, and a plurality of teeth between the first and second ends. The first end of the driver blade is configured to be attached to the piston. The driver blade is moveable with the piston from a first position toward a second position along a longitudinal axis during a fastener driving operation. A nosepiece at least partially defines a fastener driving track through which fasteners are driven. The teeth and the first end of the driver blade each have a thickness defined in a direction transverse to the longitudinal axis. The thickness of the first end of the driver blade and the thickness of the teeth are uniform. A total length of the fastener driver as measured between a distal end of the nosepiece and a distal end of the cylinder is less than 11.4 inches (289.6 mm).

The invention provides, in another aspect, a fastener driver including a housing, a cylinder disposed within the housing, a piston positioned and moveable within the cylinder, and a driver blade including a body defining a first end, a second end opposite the first end, and a plurality of teeth between the first and second ends, wherein the first end is configured to be attached to the piston. The driver blade is moveable with the piston from a first position toward a second position along a longitudinal axis during a fastener driving operation. A nosepiece at least partially defines a fastener driving track through which fasteners are driven. A lifter assembly configured to engage the teeth, wherein a single revolution of the lifter assembly sequentially engages the plurality of teeth to move the driver blade from the second position to the first position. A total length of the fastener driver as measured between a distal end of the nosepiece and a distal end of the cylinder is less than 11.4 inches (289.6 mm).

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
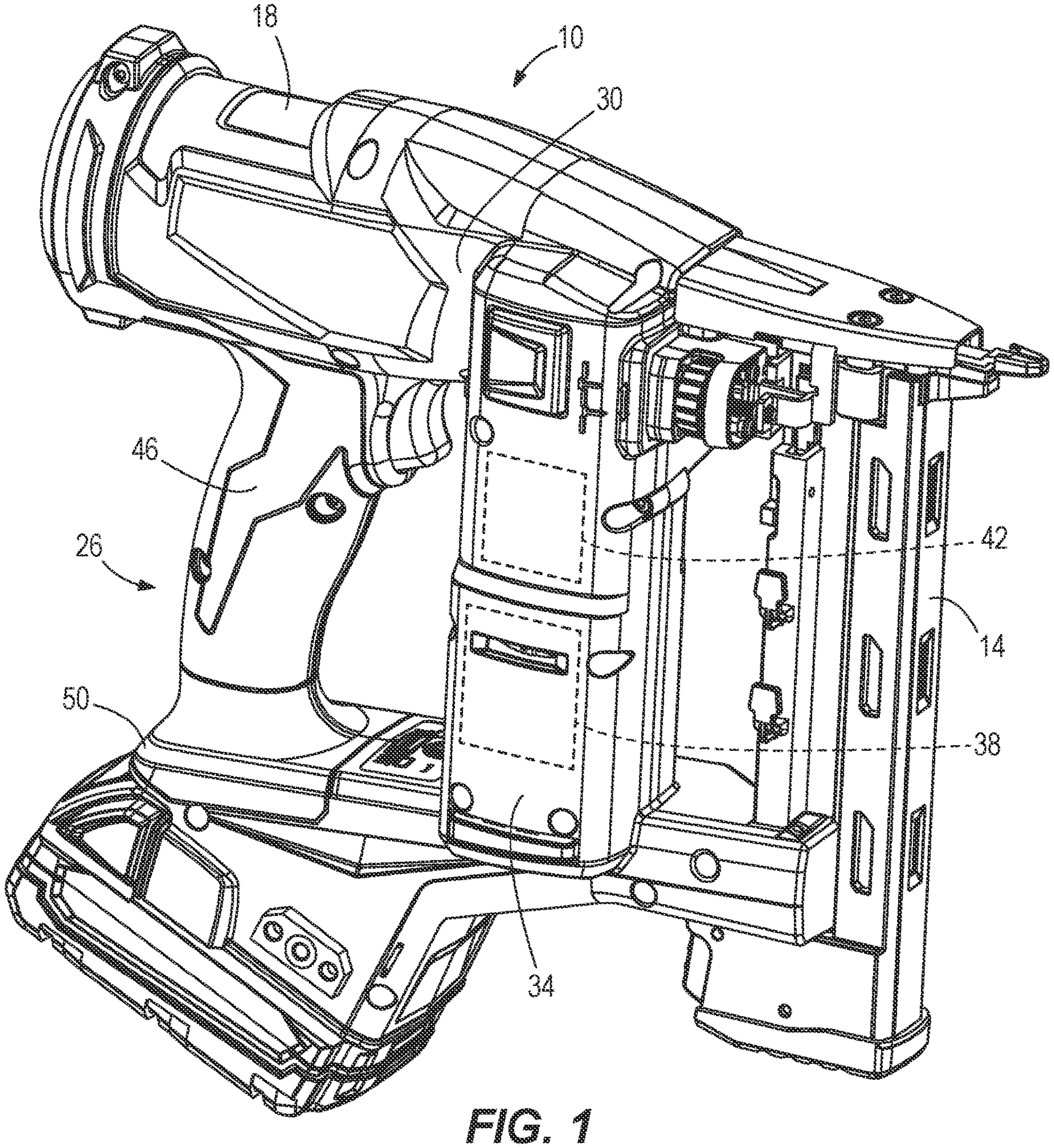
FIG. 1 is a perspective view of a powered fastener driver in accordance with an embodiment of the invention.
Figure 2:
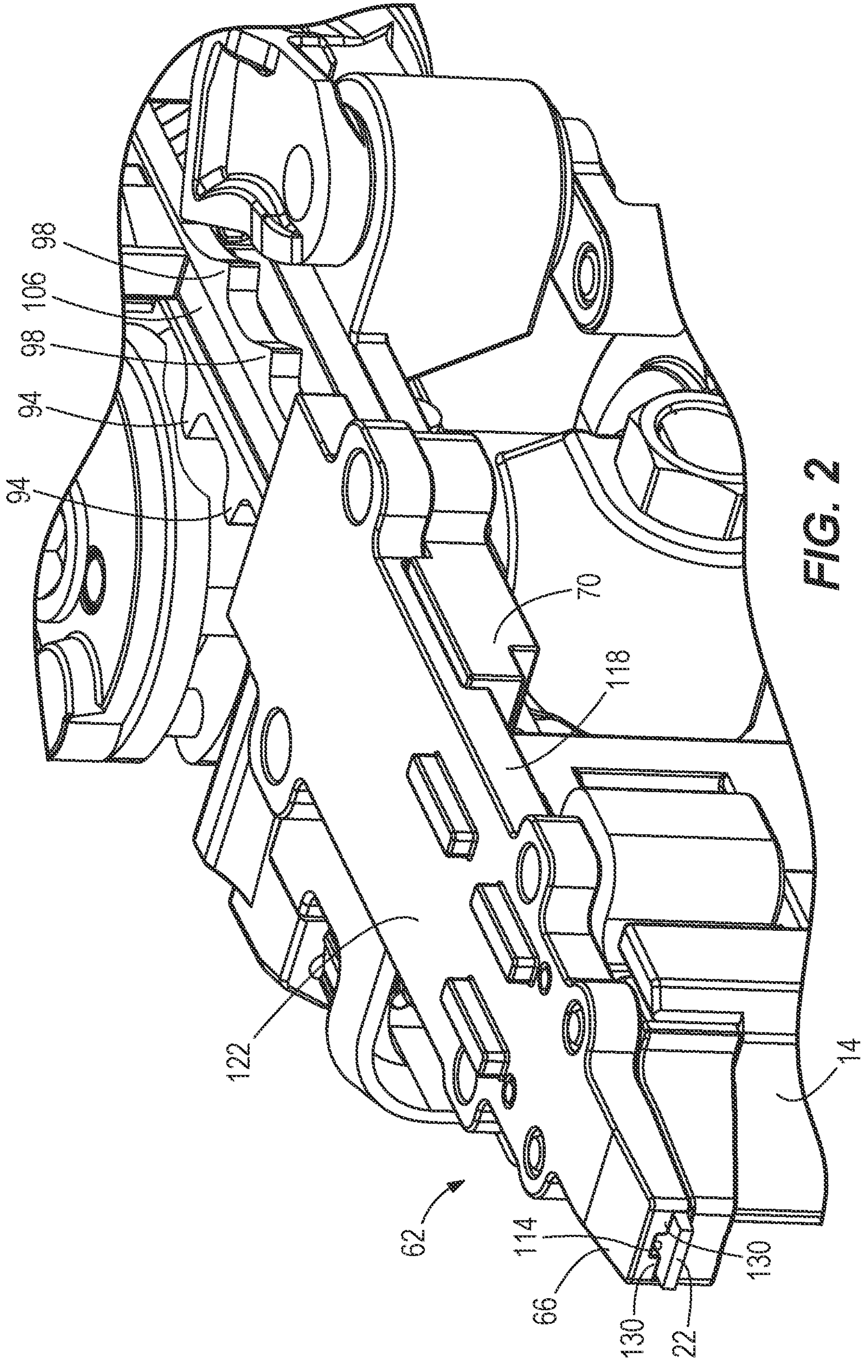
FIG. 2 is a perspective view of a nosepiece assembly of the powered fastener driver of FIG. 1.

With reference to FIG. 1, a gas spring-powered fastener driver 10 is operable to drive fasteners (e.g., nails, tacks, staples, etc.) held within a magazine 14 into a workpiece. The fastener driver 10 includes a cylinder 18. A moveable piston (not shown) is positioned within the cylinder 18. With reference to FIG. 2, the fastener driver 10 further includes a driver blade 22 that is attached to the piston and moveable therewith. The fastener driver 10 does not require an external source of air pressure, but rather includes pressurized gas in the cylinder 18.

With reference to FIG. 1, the fastener driver 10 includes a housing 26 having a cylinder housing portion 30 and a motor housing portion 34 extending therefrom. The cylinder housing portion 30 is configured to support the cylinder 18, whereas the motor housing portion 34 is configured to support a motor 38 and a transmission 42 downstream of the motor 38. In addition, the illustrated housing 26 includes a handle portion 46 extending from the cylinder housing portion 30, and a battery attachment portion 50 coupled to an opposite end of the handle portion 46. A battery (not shown) is electrically connectable to the motor 38 for supplying electrical power to the motor 38. The handle portion 46 supports a trigger (not shown), which is depressed by a user to initiate a driving cycle of the fastener driver 10.

Figure 3:
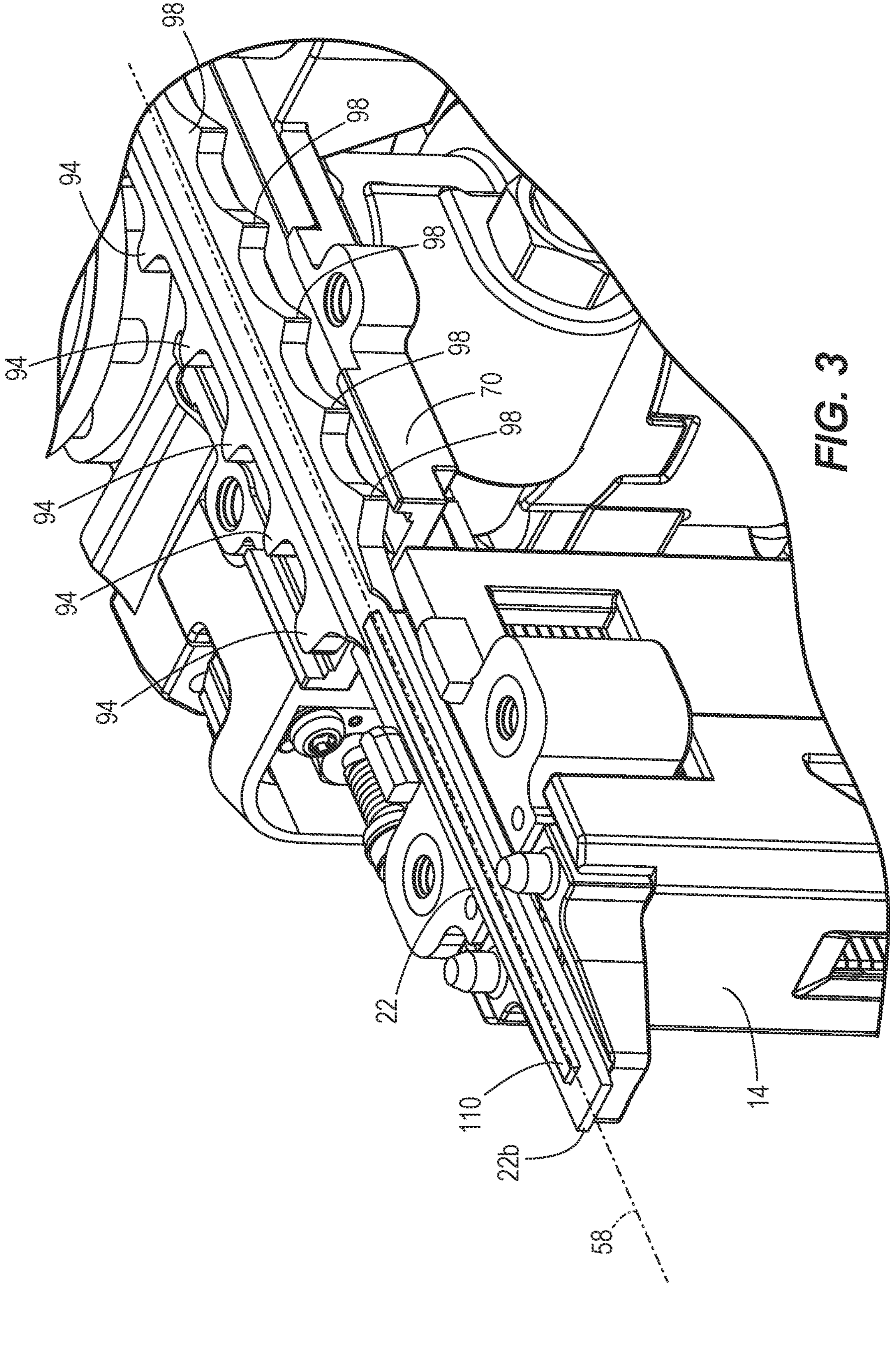
FIG. 3 is a perspective view of the nosepiece assembly of the powered fastener driver of FIG. 1, with a nosepiece removed.

With reference to FIG. 3, the driver blade 22 defines a longitudinal axis 58. During a driving cycle, the driver blade 22 and piston are moveable between a top-dead-center (TDC) or ready position within the cylinder 18, and a bottom-dead-center (BDC) or driven position, along the axis 58. The fastener driver 10 further includes a lifter assembly (not shown), which is powered by the motor 38 (FIG. 1), and which is operable to return the driver blade 22 from the driven position to the ready position.

Figure 4:
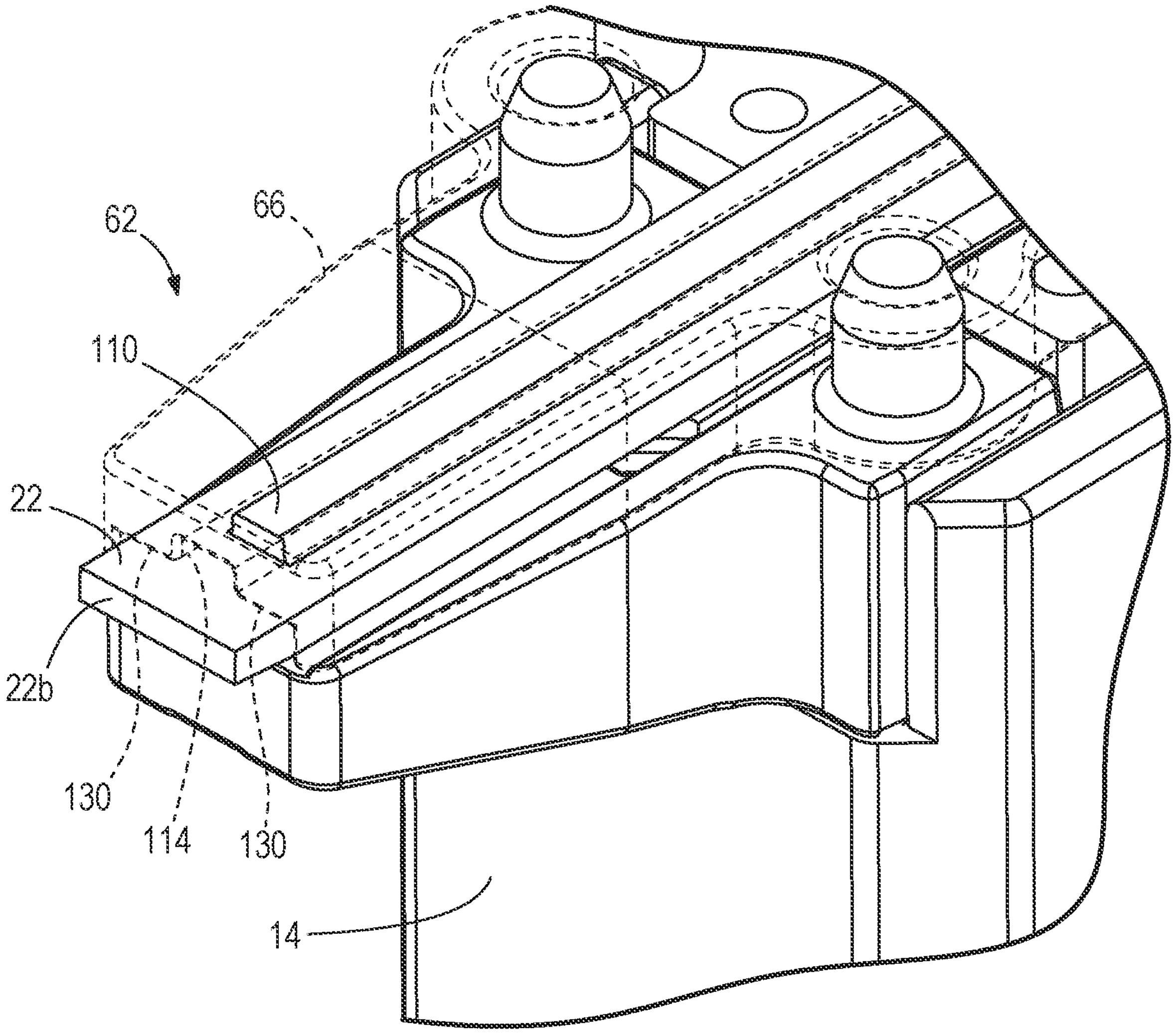
FIG. 4 is an enlarged perspective of the nosepiece assembly of the powered fastener driver of FIG. 1.

The fastener driver 10 further includes a nosepiece assembly 62 that receives collated fasteners from the magazine 14 (FIGS. 2 and 4). The nosepiece assembly 62 includes a nosepiece 66 and a shear block 70 that collectively define a fastener driving channel or track 80 (FIGS. 6A, 6B, and 8) that guides the fasteners as they are driven into a workpiece by the driver blade 22. The shear block 70 further defines an opening (not shown) that permits fasteners to pass from the magazine 14 through the shear block 70 and into the driver track 80.

Figure 5A:
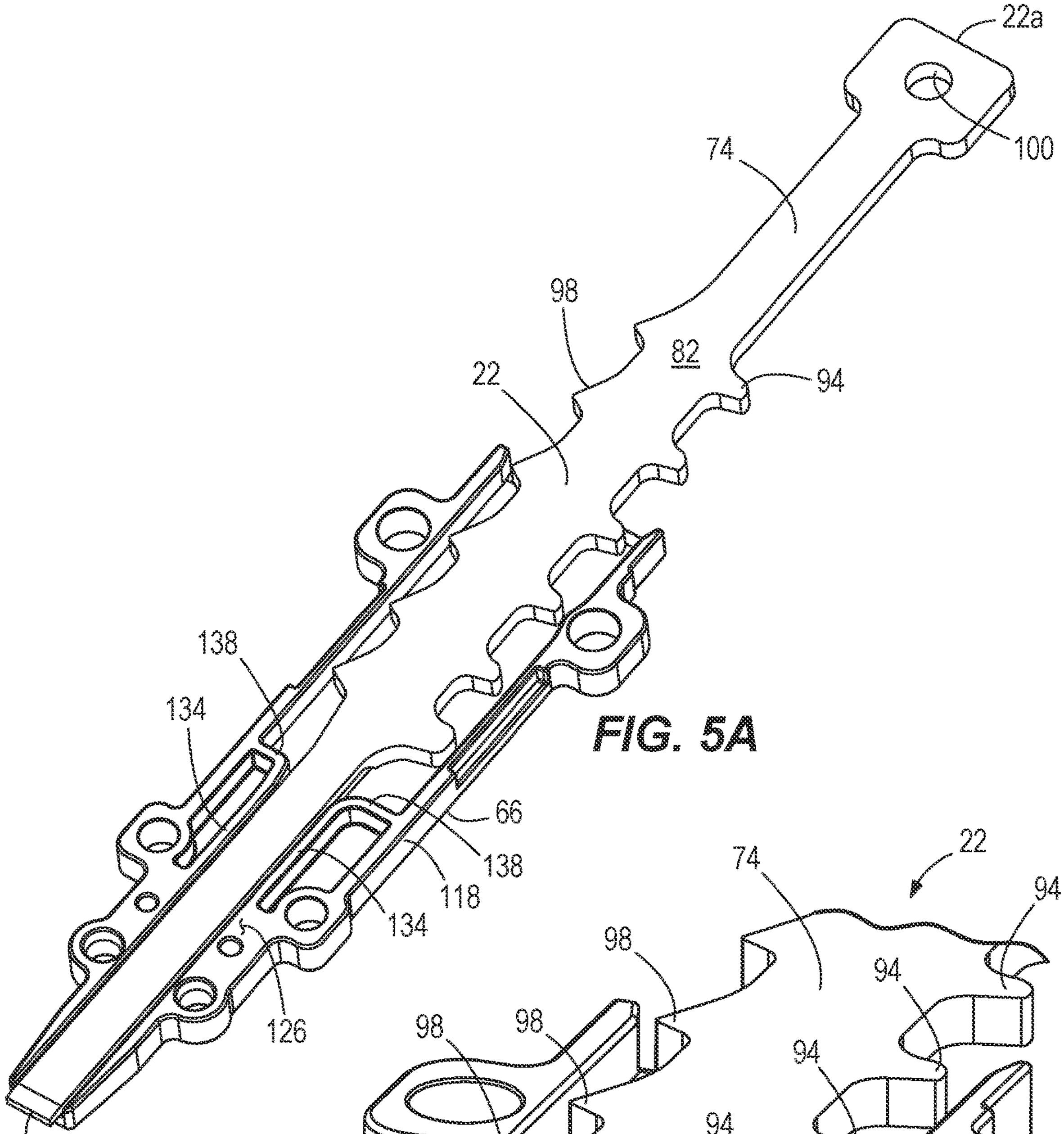
FIG. 5A is a bottom perspective view of the nosepiece and a driver blade of the powered fastener driver of FIG. 1.
Figure 5B:
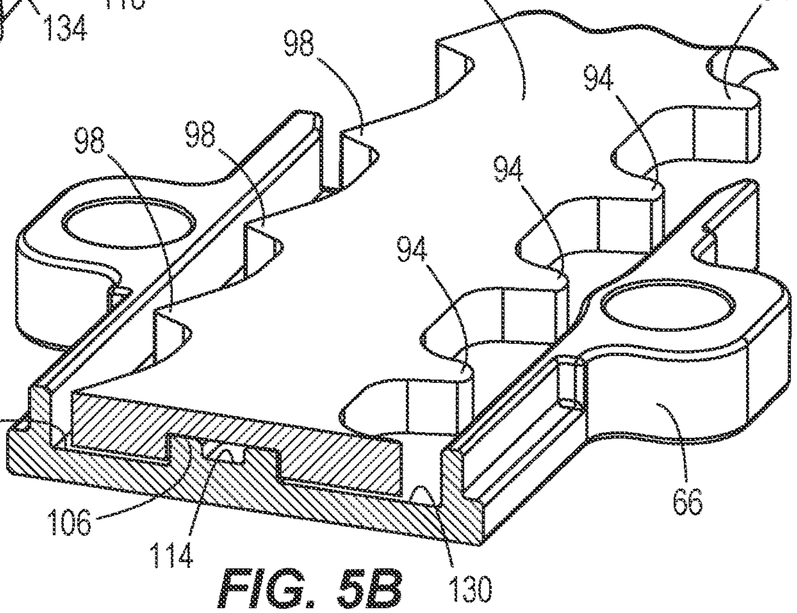
FIG. 5B is a cross-sectional view of the nosepiece and driver blade of FIG. 5A.
Figure 7:
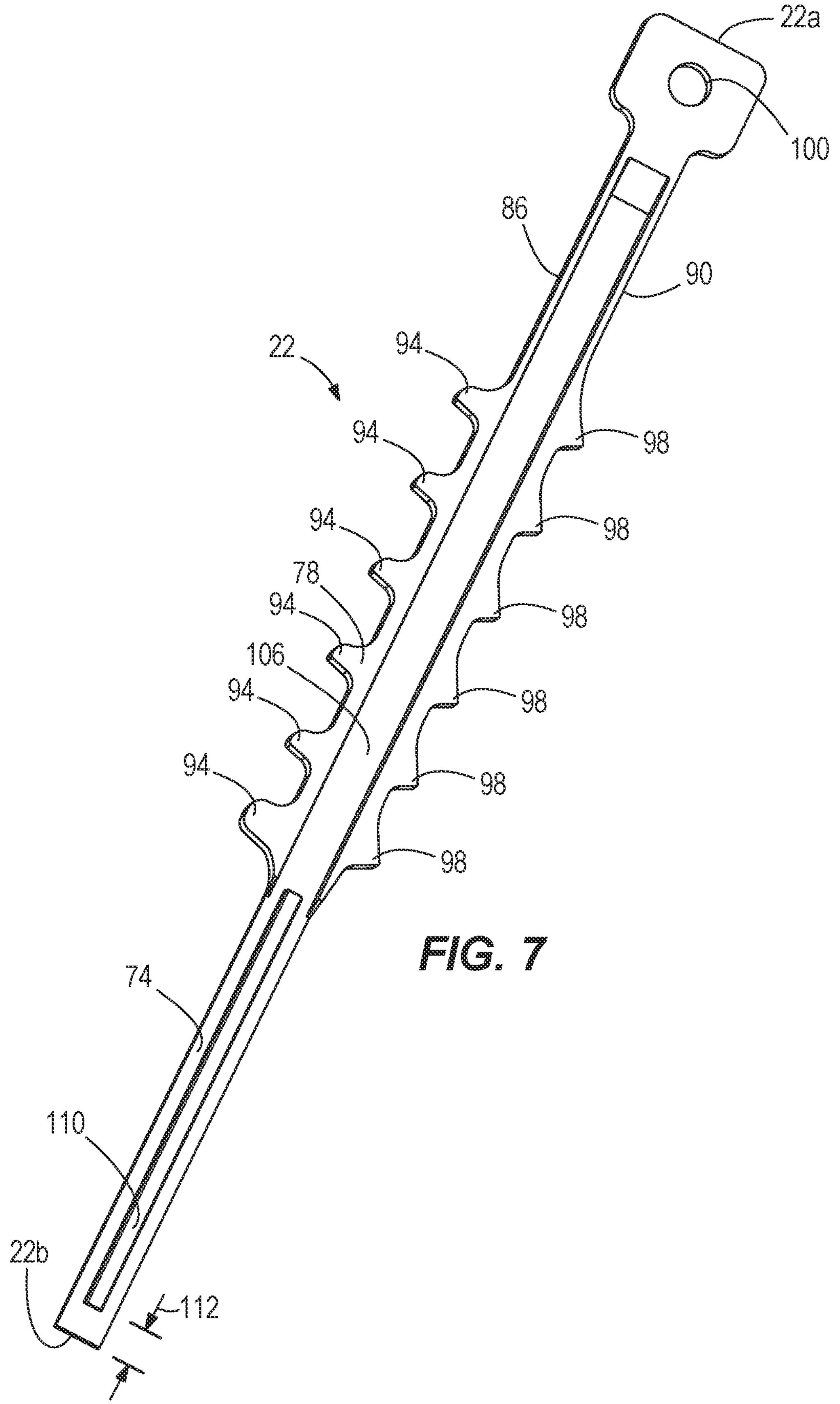
FIG. 7 is a perspective view of the driver blade of the powered fastener driver of FIG. 1.

With reference to FIGS. 5A, 5B, and 7, the driver blade 22 includes an elongated body 74 having a first planar surface (i.e., a front surface 78) and an opposite, a second planar surface (i.e., a rear surface 82). A first edge 86 extends between the front surface 78 and the rear surface 82 along one lateral side of the body 74, and a second edge 90 extends between the front surface 78 and the rear surface 82 along an opposite lateral side of the body 74. The front surface 78 is parallel to the rear surface 82. Likewise, the edges 86, 90 are also parallel.

The driver blade 22 includes a plurality of lift teeth 94 formed along the first edge 86 of the body 74. The first edge 86 extends in the direction of the axis 58, and the lift teeth 94 project from the first edge 86 in a direction transverse to the axis 58. The lift teeth 94 are sequentially engaged with the lifter assembly during the return of the driver blade 22 from the driven position to the ready position. In addition, the driver blade 22 includes a plurality of projections 98 extending from the second edge in a direction transverse to the axis 58. In one embodiment, the plurality of projections 98 are configured to engage a latch (not shown) of the fastener driver 10 for inhibiting the driver blade 22 from moving toward the driven position.

The driver blade 22 further includes a first end 22*a* and a second end, or distal end 22*b* opposite the first end 22*a*. The front and rear surfaces 78, 82, and the first and second edges 86, 90, extend between the first and second ends 22*a*, 22*b*. In the illustrated embodiment of the driver blade 22, the first end 22*a* includes an aperture 100 for receiving a fastener (e.g., screw, bolt, etc.) for connection with the piston. The second end 22*b* of the driver blade 22 is oriented perpendicular to the axis 58 for striking fasteners fed from the magazine 14 and driving the fasteners into a workpiece. The driver blade 22 additionally includes an elongated recess 106 extending along the front surface 78 (i.e., the surface facing the nosepiece 66) of the driver blade 22, the purpose of which is described below.

With reference to FIG. 7, the driver blade 22 includes a guiding projection 110 positioned on the elongated body 74. The guiding projection 110 is parallel with the longitudinal axis 58 of the driver blade 22 and also extends in a direction that is transverse to the axis 58 to be received within a corresponding recess 114 (FIGS. 4, 6A, 6B, and 8) within the nosepiece 66 to provide lateral stability to the driver blade 22 as it reciprocates between its ready and driven positions. The guiding projection 110 is located near the second end 22*b* of the driver blade 22 and terminates before the distal end 22*b* of the driver blade 22, creating a gap 112 between the guiding projection 110 and the distal end 22*b* (FIG. 7). This allows for the driver blade 22 to be guided within the nosepiece 66, but also prevents the projection 110 from contacting the work surface with the driver blade 22. As such, the guiding projection 110 does not cause a "mar" or "indentation" on the work surface as a fastener (i.e., staple 102) is driven into the surface.

Figure 6A:
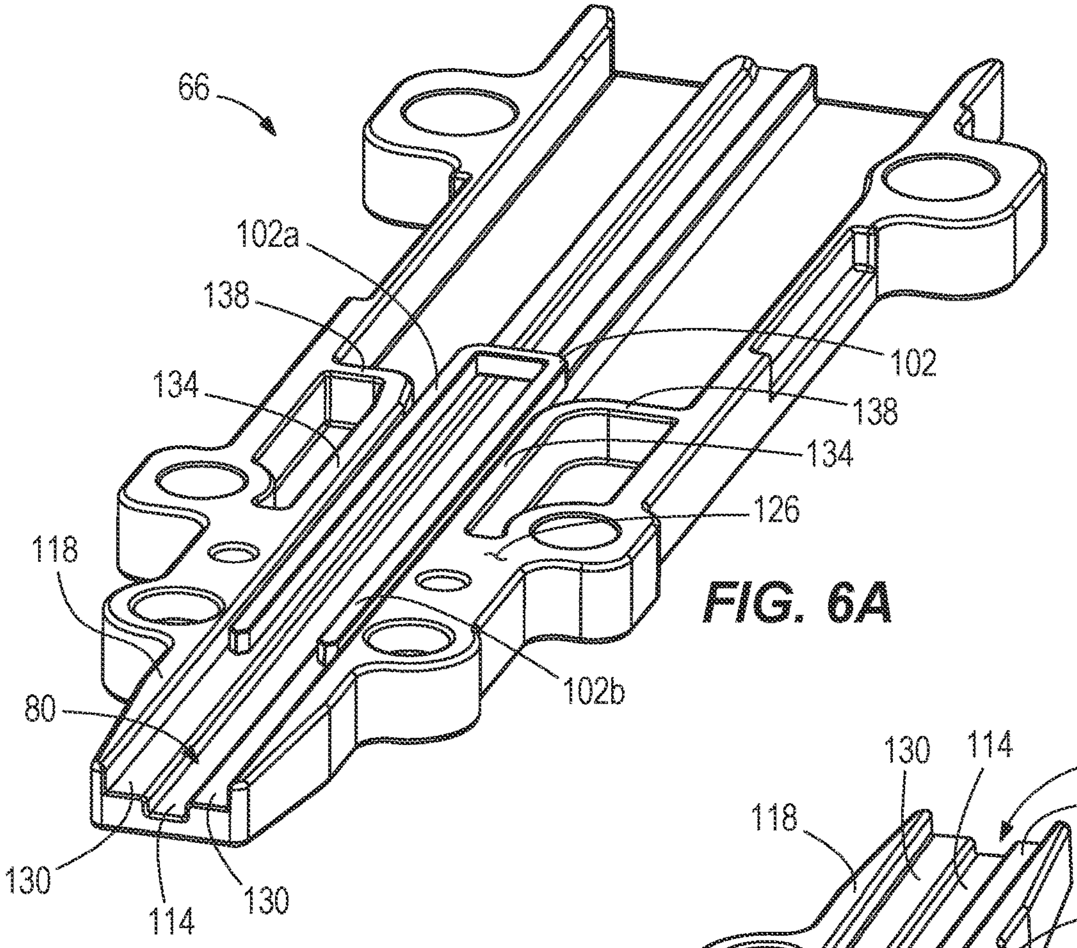
FIG. 6A is a bottom perspective view of the nosepiece of the powered fastener driver of FIG. 1, illustrating a fastener in a fastener driving track.
Figure 6B:
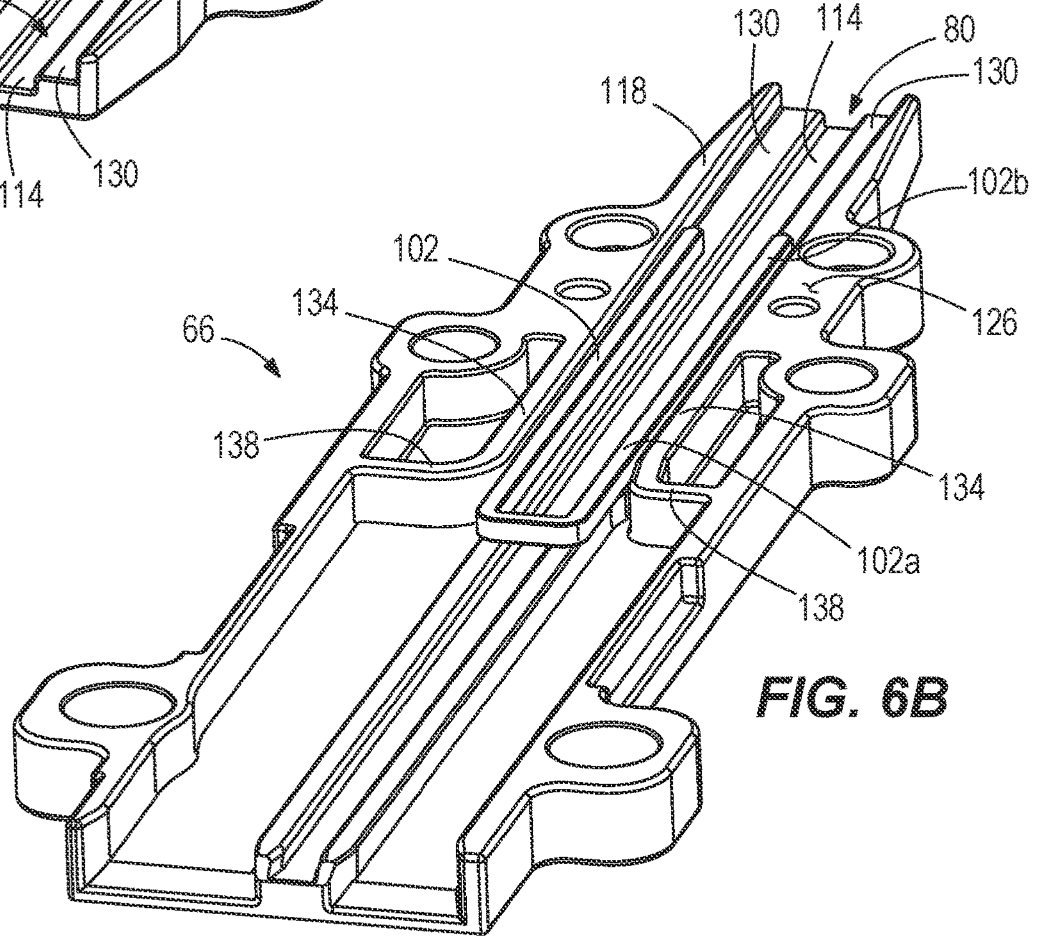
FIG. 6B is a reverse perspective view of the nosepiece and fastener of FIG. 6B.

The nosepiece 66 includes an elongated body 118 having a first planar surface, or front surface 122 and an opposite, second planar surface, or rear surface 126, such that the front surface 122 is parallel to the rear surface 126. The nosepiece 66 further includes an elongated guide groove 130 within the rear surface 126 extending parallel with the axis 58 that partially defines the fastener driver track 80 (FIGS. 6A and 6B). The guide groove 130 is sized to receive the width of the driver blade 22 (below the last of the teeth 94 and projections 98) and the staples 102 to provide lateral stability to the staples 102 as they are driven from the nosepiece assembly 62 (FIG. 4). The recess 114 in which the guiding projection 110 is received is also located in the guide groove 130.

Figure 8:
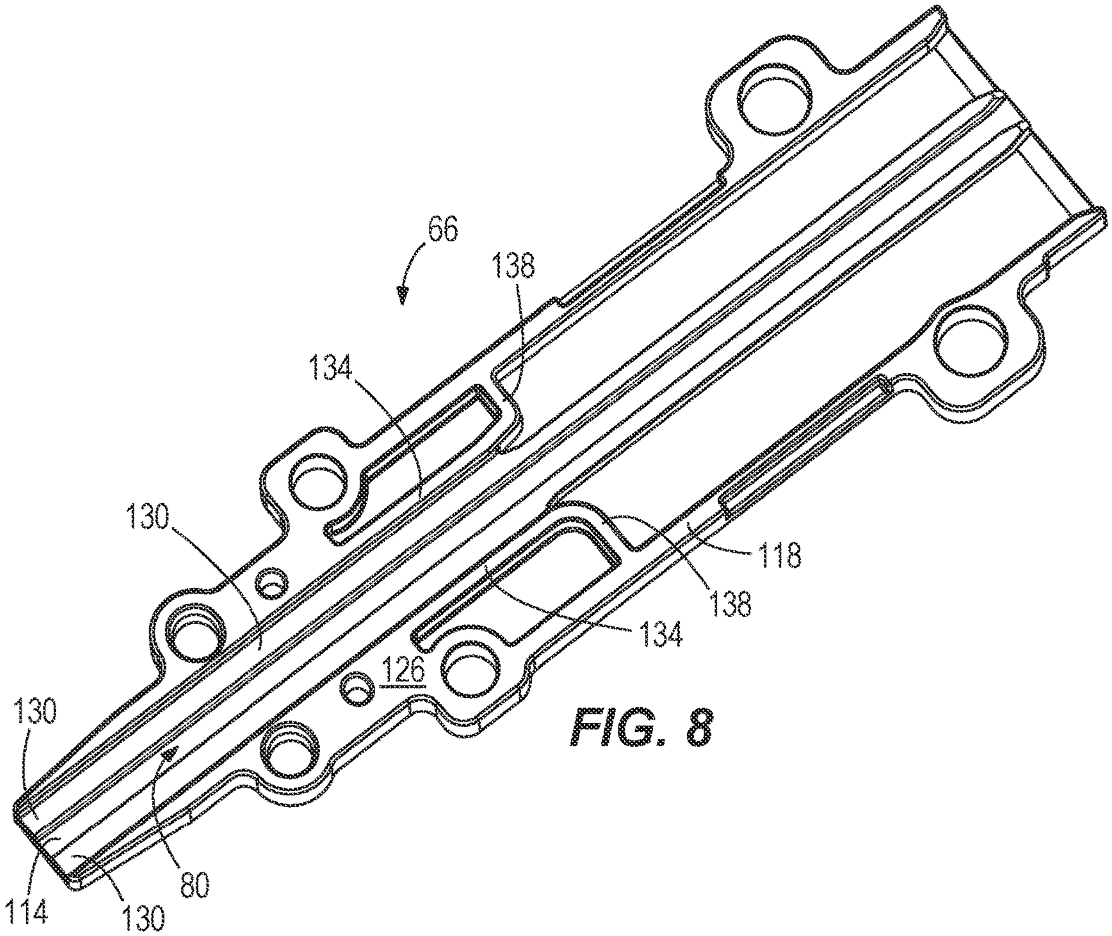
FIG. 8 is a bottom perspective view of the nosepiece of the powered fastener driver of FIG. 1.
Figure 9:
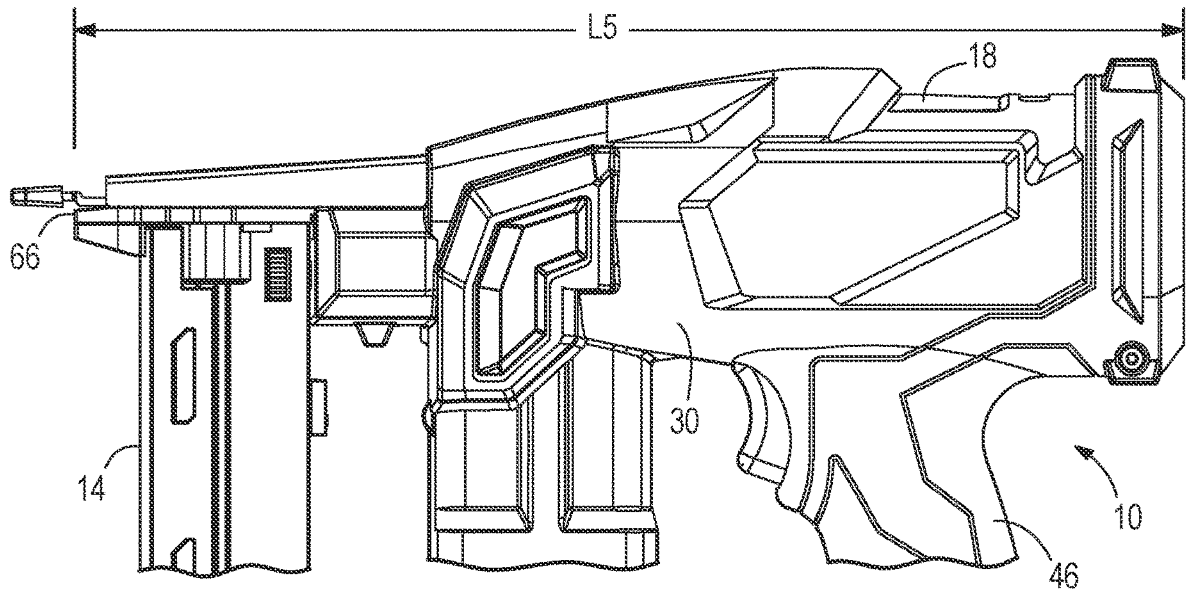
FIG. 9 is a side view of the fastener driver of FIG. 1.
Figure 10:
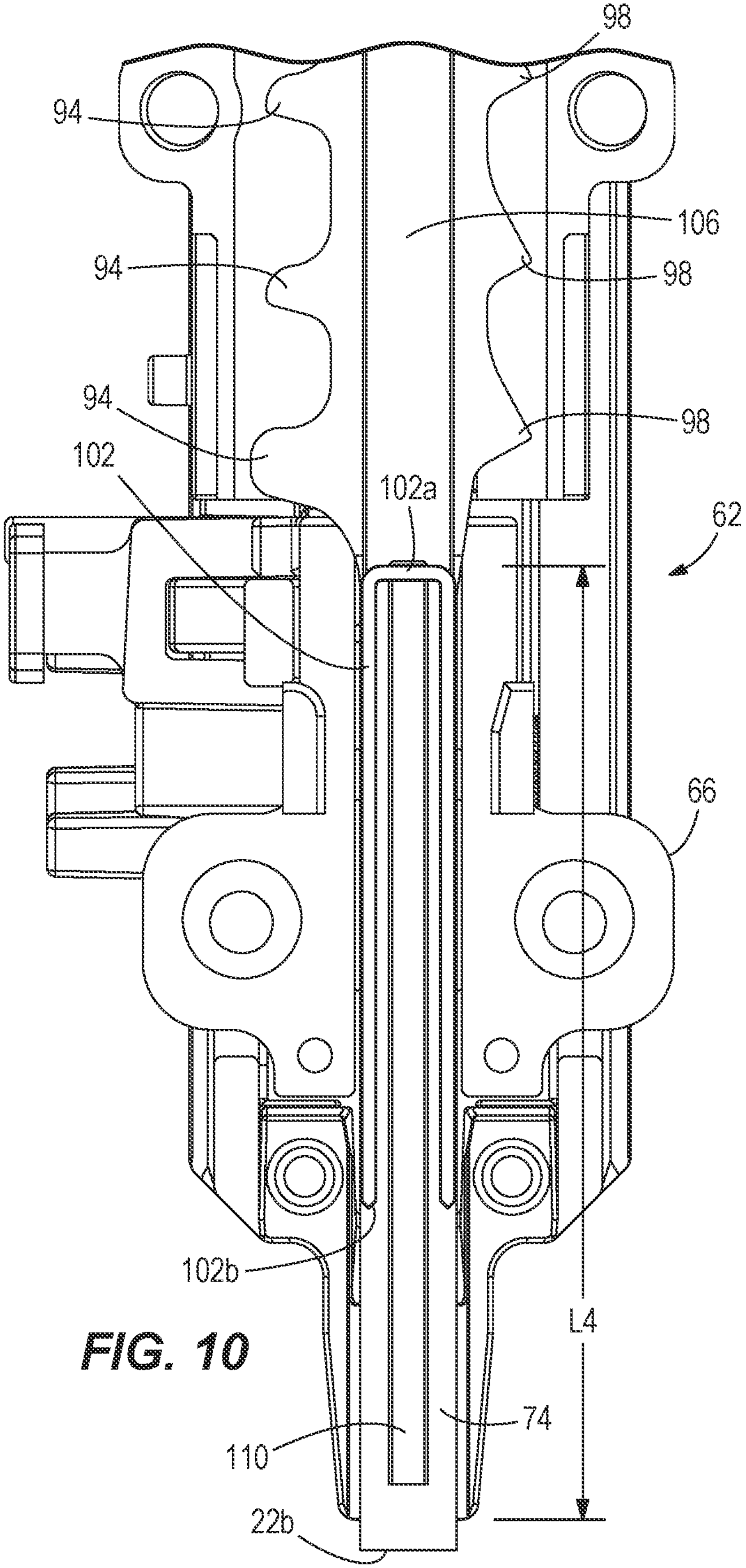
FIG. 10 is a front view of the nosepiece assembly of FIG. 2, with portions removed.

With reference to FIGS. 6A, 6B, and 8, the nosepiece 66 includes guide ribs 134 extending along the rear surface 126 of the nosepiece 66, such that the ribs 134 are substantially parallel to each other. The space between the ribs 94 defines an extension of the guide groove 130 and provides additional lateral support for the staples 102 during a firing operation. Specifically, when in the fastener driver track 80, an upper portion 102*a* of the staple 102 is supported by the guide ribs 134 and a lower portion 102*b* of the staple 102 is supported within the guide groove 130. The nosepiece 66 additionally includes laterally extending ribs 138 connecting opposite sides of the nosepiece 66 with the respective ribs 134. The laterally extending ribs 138 are oriented perpendicular relative to the guide ribs 134. In alternative embodiments (FIGS. 14-18), the laterally extending ribs 138 may be omitted.

Figure 11:
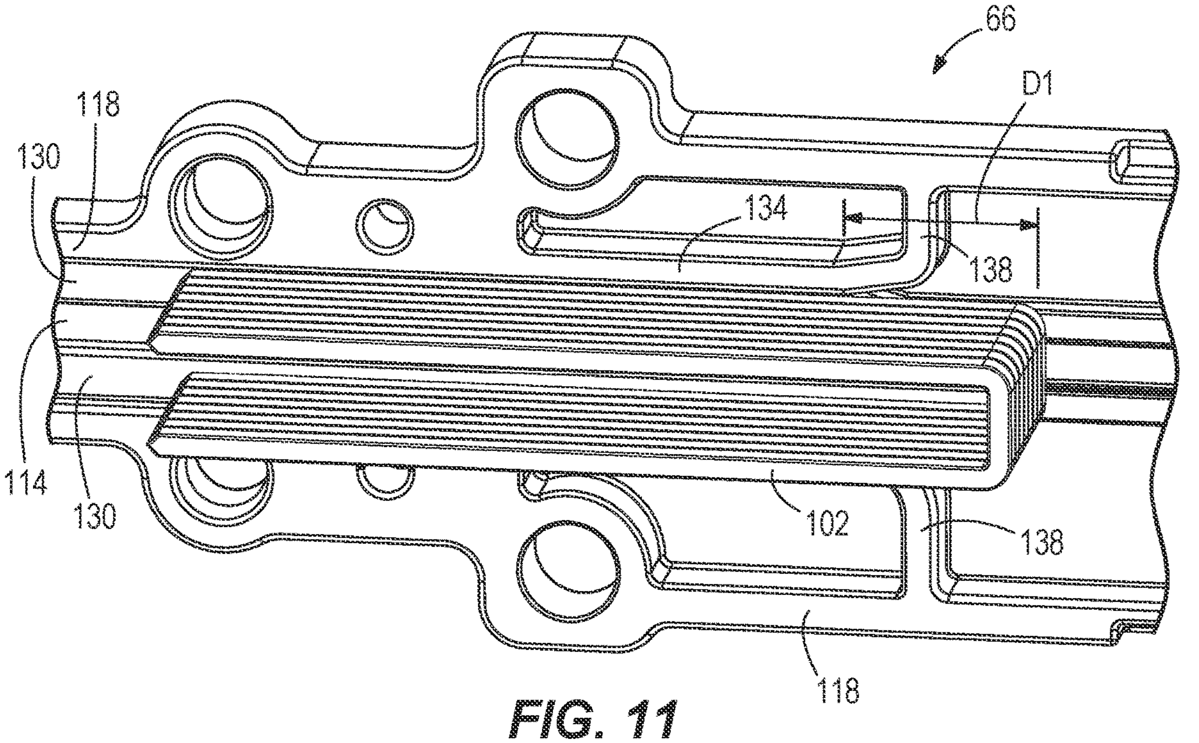
FIG. 11 is a bottom perspective view of the nosepiece and collated fasteners received in a fastener driving track of the nosepiece.
Figure 12:
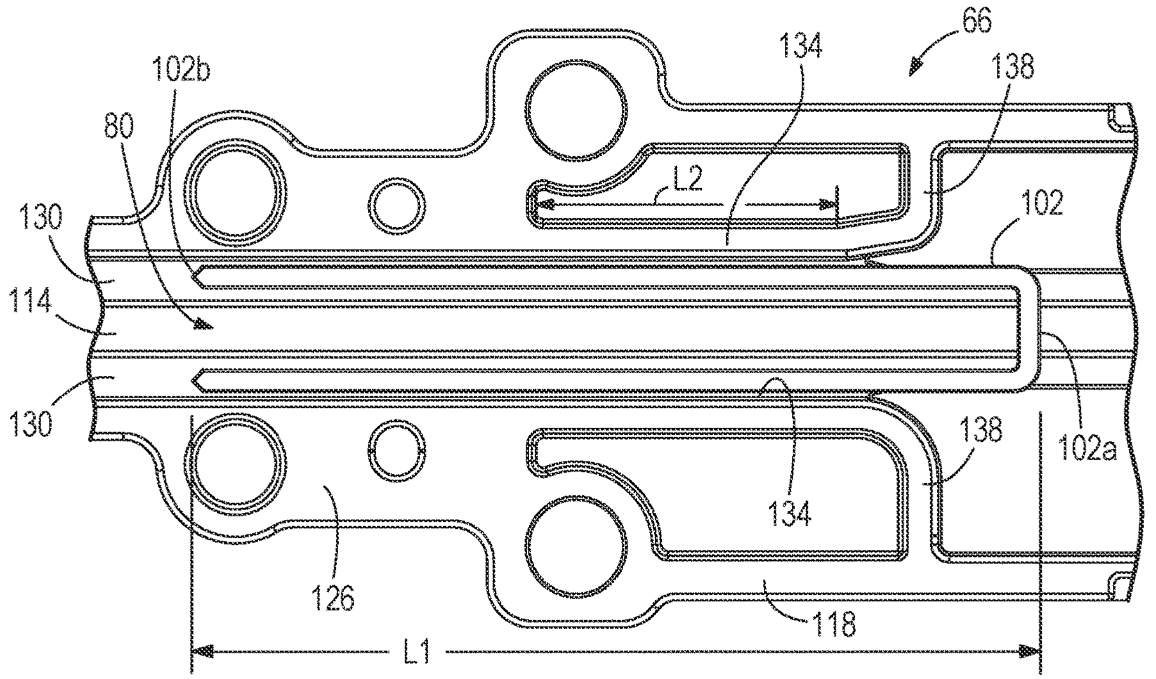
FIG. 12 is plan view of the nosepiece and collated fasteners of FIG. 11.
Figure 13:
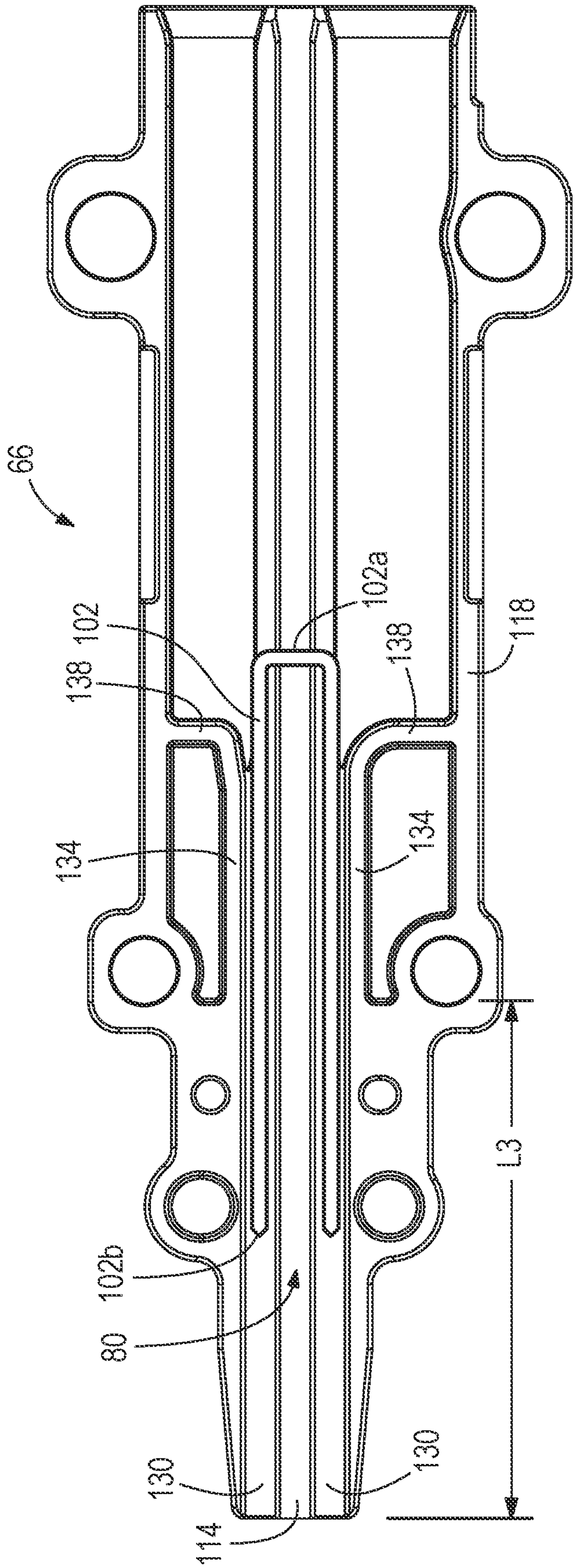
FIG. 13 is another plan view of the nosepiece and collated fasteners of FIG. 11.

More specifically, and with reference to the illustrated embodiment of the fastener driver 10 of FIGS. 11-13, the staple 102 includes a length L1 of approximately 37.75 mm. The guide ribs 134 include a length L2 of 13.25 mm and the guide groove 130 includes a length L3 of 31.20 mm. Furthermore, a distance D1 from a crown of the staple 102 to a distal end of the guide rib 134 is approximately 5.5 mm. When the staple 102 is loaded from the magazine 14 into the fastener driving track 80, the guide ribs 134 support approximately 13.25 mm, or 35%, of the length of the staple 102 (coinciding with length L2). Additionally, the guide groove 130 supports approximately 21.00 mm, or 55%, of the length L1 of the staple 102 (coinciding with length L3). As such, in total, approximately 34.25 mm, or 90%, of the length L1 of the staple 102 is supported by a combination of the guide ribs 134 and the guide groove 130, leaving the remaining 10% of the length L1 of the staple 102 unsupported and extending beyond the distal ends of the guide ribs 134 (coinciding with distance D1).

FIGS. 14-18 illustrate an alternative embodiment of a fastener driver 10', with like parts as the fastener driver 10 of FIGS. 1-13 being shown with like reference numerals plus a prime marker (').

The fastener driver 10' includes a driver blade 22' that is attached to a piston and moveable therewith. The fastener driver 10' further includes a nosepiece assembly 62' including a nosepiece 66' and a shear block (not shown, similar to the shear block 70 shown in FIGS. 2-3) that collectively define a fastener driving channel or track 80' (FIG. 17) that guides fasteners as they are driven into a workpiece by the driver blade 22'.

Figure 16:
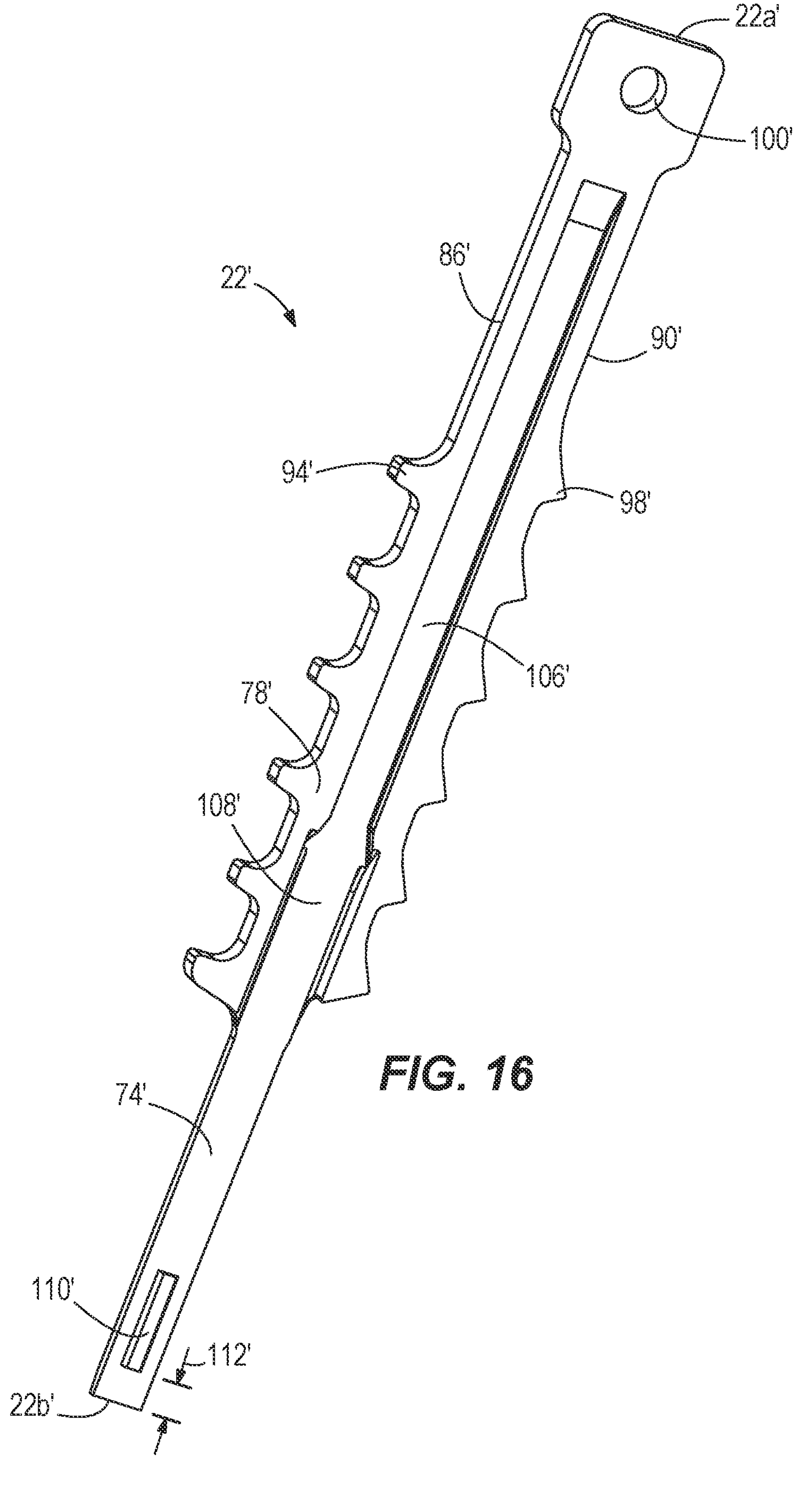
FIG. 16 is a perspective view of the driver blade of the powered fastener driver FIG. 14.

With reference to FIG. 16, the driver blade 22' includes an elongated recess 106' extending along a front surface 78' (i.e., the surface facing the nosepiece 66') of the driver blade 22'. The elongated recess 106' includes a portion 108' having a greater width than the rest of the recess 106', the purpose of which is described below.

Figure 17:
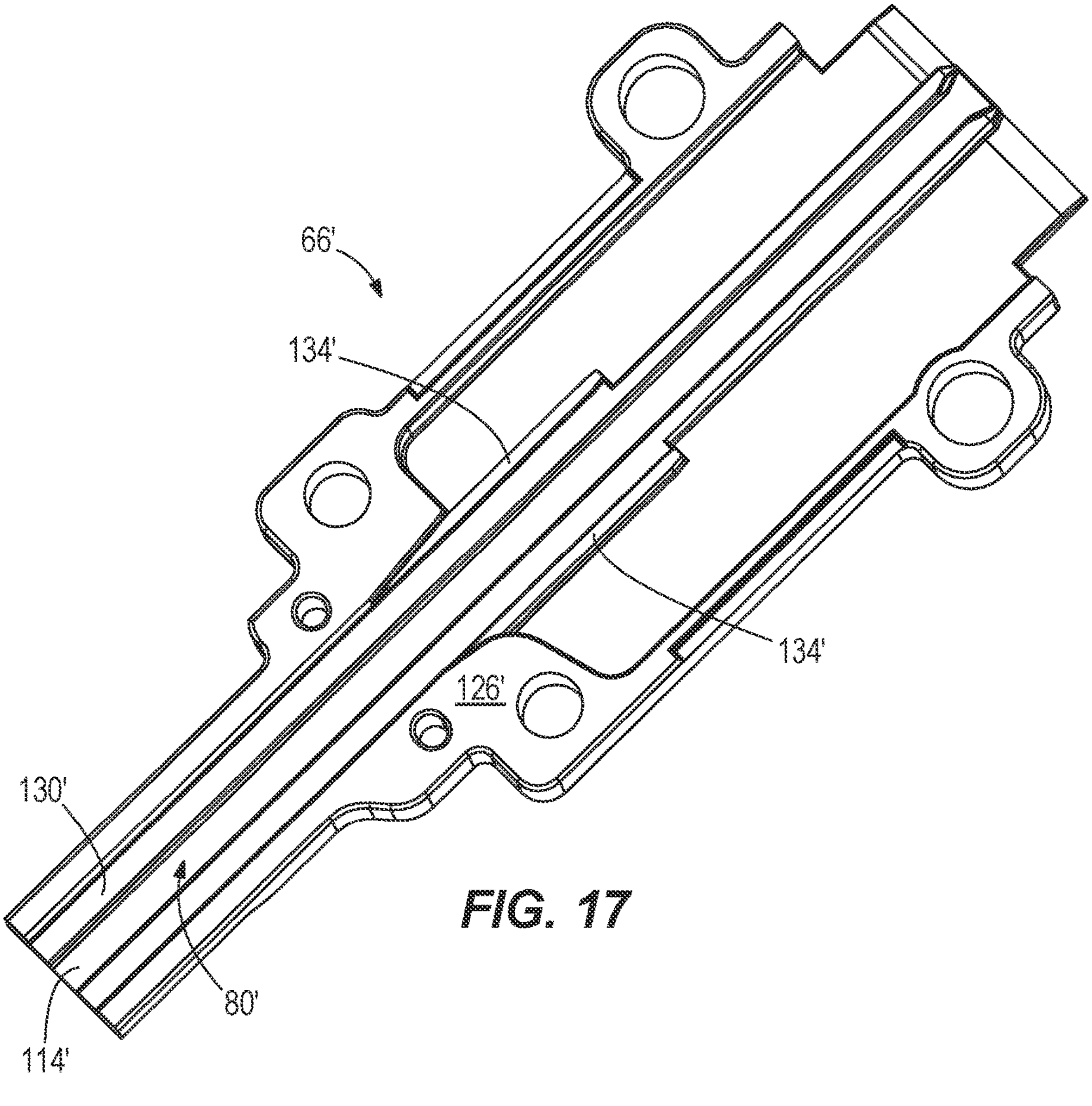
FIG. 17 is a bottom perspective view of the nosepiece of the powered fastener driver of FIG. 14.
Figure 18:
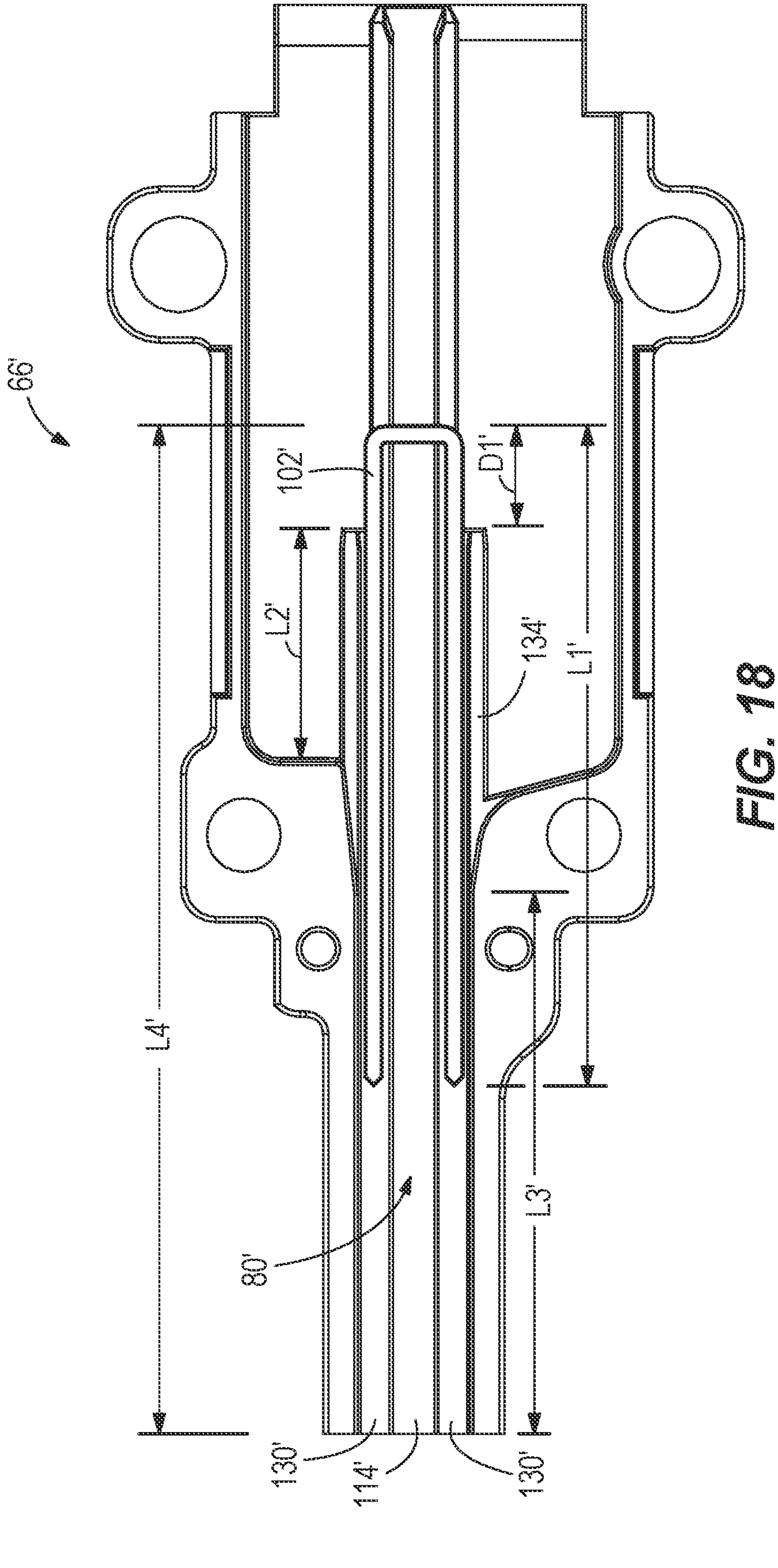
FIG. 18 is a plan view the nosepiece and collated fasteners of FIG. 14.

With reference to FIGS. 17-18, the nosepiece 66' includes a guide groove 130' sized to receive the width of the driver blade 22' (below the last of teeth 94' and projections 98' of the driver blade 22') and staples 102' to provide lateral stability to the staples 102' as they are driven from the nosepiece assembly 62'. The nosepiece 66' additionally includes guide ribs 134' extending along a rear surface 126' of the nosepiece 66', such that the ribs 134' are substantially parallel to each other. The space between the ribs 94' defines an extension of the guide groove 130' and provides additional lateral support for the staples 102' during a firing operation.

More specifically, and with reference to the illustrated embodiment of the fastener driver 10' of FIG. 18, the staple 102' includes a length L1' of approximately 37.75 mm. The guide ribs 134' include a length L2' of 13.25 mm and the guide groove 130' includes a length L3' of 31.20 mm. Furthermore, a distance D1' from a crown of the staple 102' to a distal end of the guide rib 134' is approximately 5.5 mm. When the staple 102' is loaded into the fastener driving track 80', the guide ribs 134' support approximately 13.25 mm, or 35%, of the length of the staple 102'. Additionally, the guide groove 130' supports approximately 21.00 mm, or 55%, of the length L1' of the staple 102'. As such, in total, approximately 34.25 mm, or 90%, of the length L1' of the staple 102' is supported by a combination of the guide ribs 134' and the guide groove 130', leaving the remaining 10% of the length L1' of the staple 102' unsupported and extending beyond the distal ends of the guide ribs 134'.

Figure 14:
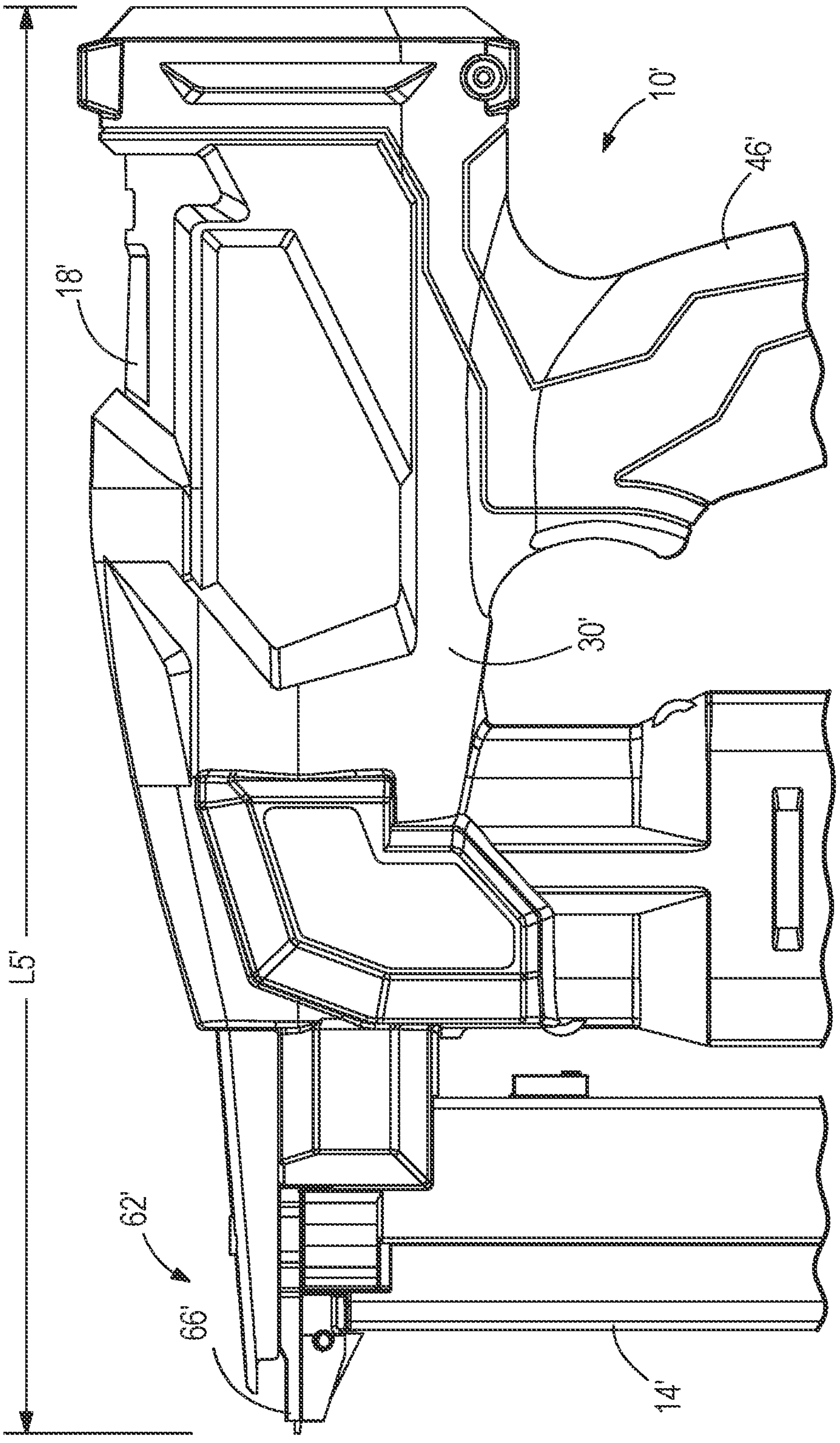
FIG. 14 is a side view of a powered fastener driver in accordance with another embodiment of the invention.
Figure 15A:
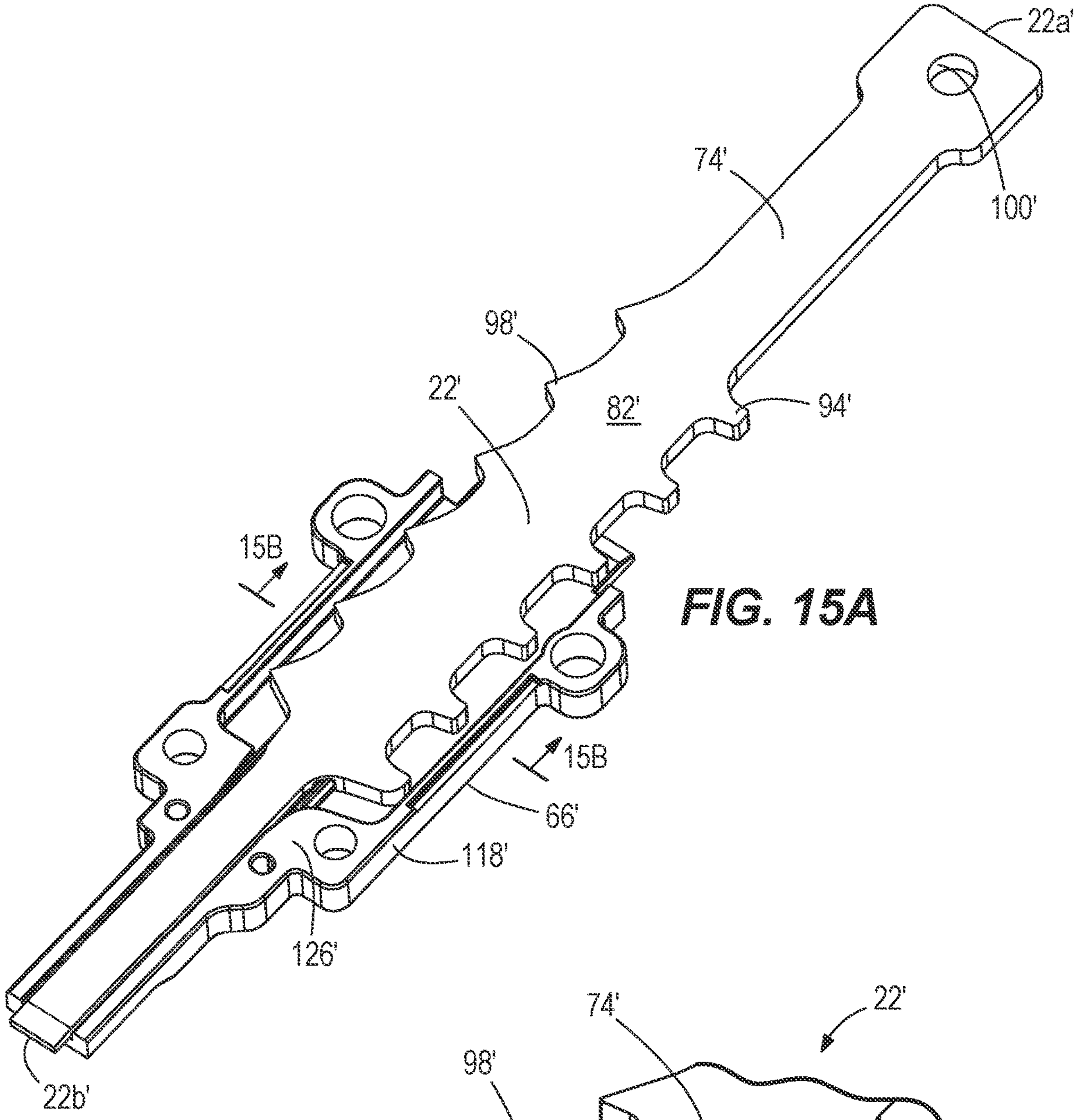
FIG. 15A is a bottom perspective view of a nosepiece and a driver blade of the powered fastener driver of FIG. 14.
Figure 15B:
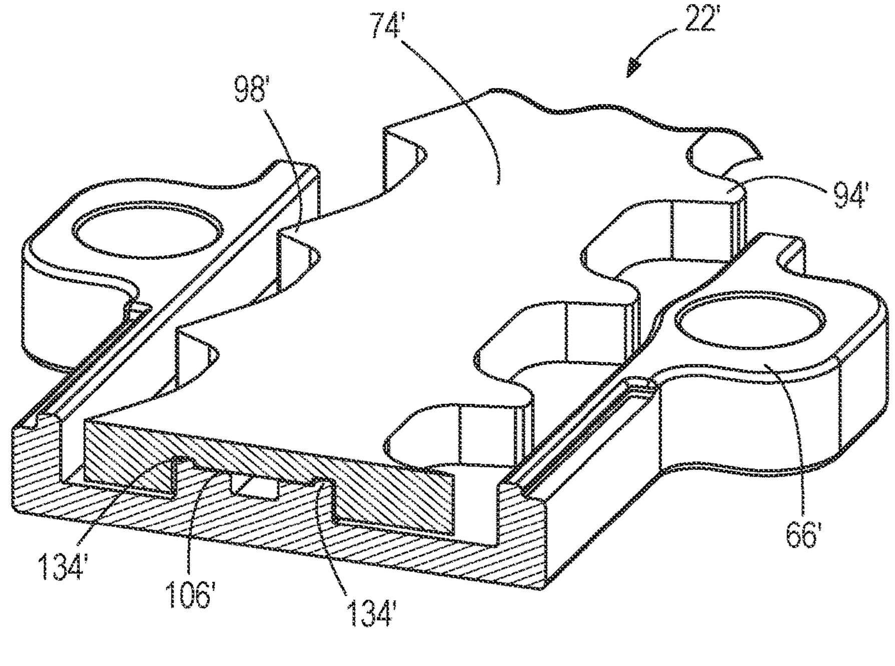
FIG. 15B is a cross-sectional view of the nosepiece and driver blade of the powered fastener driver of FIG. 14.

As the driver blade 22' moves from the ready position to the driven position (with the driven position being shown in FIGS. 15A and 15B), the guide ribs 134' of the nosepiece 66' slide within the enlarged portion 108' of the elongated recess 106' in the driver blade 22' (FIGS. 15B and 16). Because the driver blade 22' overlaps the guide ribs 134' in this manner, the overall height of the fastener driver 10' is reduced, compared to a prior art fastener driver in which the majority of the length of the fasteners is supported within the guide groove 130'. In some embodiments of the fastener driver 10', the ratio of a length L4' from the crown of the staple 102' to a distal end of the nosepiece 66' (FIG. 18) to a total length L5' of the tool 10' (FIG. 14) is less than 25%. In the illustrated embodiment of the fastener driver 10', the length L4' is 57.5 mm (FIG. 18), and the total length L5' of the tool 10' is 263.3 mm (FIG. 14). As such, the ratio of L4':L5' is approximately 22%.

Various feature of the invention are set forth in the following claims.

What is claimed is:

1. A fastener driver comprising:

a housing;

a cylinder disposed within the housing;

a piston positioned and moveable within the cylinder;

a driver blade including a body defining a first end, a second end opposite the first end, a first edge, a second edge, a plurality of teeth extending from the first edge of the body between the first and second end, the body having an elongated recess extending along a surface of the driver blade between the first and second edges, and along a portion of the first edge from which the plurality of teeth extend, and a guiding projection positioned at least partially within the elongated recess at a position between the first and second edges, wherein the first end includes an aperture defined therein, and wherein the aperture is sized to receive a fastener to attach the driver blade to the piston, wherein the driver blade is moveable with the piston from a first position toward a second position along a longitudinal axis during a fastener driving operation;

a nosepiece at least partially defining a fastener driving track through which fasteners are driven; and a lifter assembly configured to engage the teeth, wherein a single revolution of the lifter assembly sequentially engages the plurality of teeth to move the driver blade from the second position to the first position.

2. The fastener driver of claim 1, wherein the teeth and the first end of the driver blade each have a thickness defined in a direction transverse to the longitudinal axis, and wherein the thickness of the first end and the thickness of the teeth are uniform.

3. The fastener driver of claim 1, wherein the nosepiece includes a longitudinal guide groove in which the fasteners are received, and wherein the longitudinal guide groove at least partially defines a fastener driving track.

4. The fastener driver of claim 3, wherein the elongated recess extends along a surface of the driver blade facing the nosepiece, and wherein the nosepiece includes parallel guide ribs extending from an interior surface of the nosepiece, thereby defining an extension of the guide groove.

5. The fastener driver of claim 4, wherein in the first position of the driver blade, an upper portion of the fastener within the fastener driving track is received between the parallel guide ribs and a lower portion of the fastener is received in the guide groove, and wherein when the driver blade is in the second position, the parallel guide ribs are at least partially received within the elongated recess in the driver blade.

6. The fastener driver of claim 5, wherein when the driver blade is in the second position, the driver blade partially overlaps with the guide ribs, thereby allowing a first portion of the fastener to be received in the guide ribs and a lower, second portion of the fastener to be received in the guide groove.

7. The fastener driver of claim 1, wherein when the driver blade is in the second position, the driver blade partially overlaps with a portion of the nosepiece, and a ratio of a length from a crown of one of the fasteners to a distal end of the nosepiece to the total length of the fastener driver is less than 25%.

8. The fastener driver of claim 1, wherein the total length of the fastener driver measured between the distal end of the nosepiece and the distal end of the cylinder is about 10.4 inches (263.3 mm).

9. The fastener driver of claim 1, wherein a total length of the fastener driver as measured between a distal end of the nosepiece and a distal end of the cylinder is less than 11.4 inches (289.6 mm).

* * * * *